US012783327B2

(12) United States Patent
Yang et al.

(10) Patent No.: US 12,783,327 B2
(45) Date of Patent: Nov. 3, 2026

(54) LOOP DETECTION METHOD AND APPARATUS, ELECTRONIC DEVICE, AND STORAGE MEDIUM

(71) Applicant: BEIJING OCEANBASE TECHNOLOGY CO., LTD., Beijing (CN)

(72) Inventors: Zhenkun Yang, Hangzhou (CN); Chen Qian, Hangzhou (CN); Xuwang Teng, Hangzhou (CN); Fanyu Kong, Hangzhou (CN); Fusheng Han, Hangzhou (CN)

(73) Assignee: BEIJING OCEANBASE TECHNOLOGY CO., LTD., Beijing (CN)

( * ) Notice: Subject to any disclaimer, the term of this patent is extended or adjusted under 35 U.S.C. 154(b) by 376 days.

(21) Appl. No.: 18/562,067

(22) PCT Filed: May 7, 2022

(86) PCT No.: PCT/CN2022/091537
§ 371 (c)(1),
(2) Date: Nov. 17, 2023

(87) PCT Pub. No.: WO2022/242477
PCT Pub. Date: Nov. 24, 2022

(65) Prior Publication Data

US 2024/0241771 A1 Jul. 18, 2024

(30) Foreign Application Priority Data

May 20, 2021 (CN) ......................... 202110550972.8

(51) Int. Cl.
*G06F 9/52* (2006.01)
*G06F 9/46* (2006.01)
(Continued)

(52) U.S. Cl.
CPC .............. *G06F 9/524* (2013.01); *G06F 9/466* (2013.01); *G06F 16/27* (2019.01)

(58) Field of Classification Search
CPC .......... G06F 9/524; G06F 16/27; G06F 9/466; H04L 43/08; H04L 45/18
See application file for complete search history.

(56) References Cited

U.S. PATENT DOCUMENTS 8,479,215 B2 * 7/2013 Lakshmanan ........... G06F 9/505 709/201
9,355,083 B1 * 5/2016 Meran ................ G06F 16/1756
(Continued)

FOREIGN PATENT DOCUMENTS

CN 102076049 A 5/2011
CN 106557371 A 4/2017
(Continued)

OTHER PUBLICATIONS

Deng et al., "Improved closed-loop detection and Octomap algorithm based on RGB-D Slam," 2020 IEEE International Conference on Artificial Intelligence and Computer Applications (ICAICA) Year: 2020 | Conference Paper | Publisher: IEEE.*
(Continued)

*Primary Examiner* — Roderick Tolentino

(57) ABSTRACT

The specification provides a method includes: updating a depth value of a target node or a depth value of a downstream node of the target node; receiving a depth value sent by an upstream node of the target node, and comparing the depth value of the target node with the depth value sent by the upstream node of the target node; in response to that the depth value of the target node is less than the depth value sent by the upstream node of the target node, updating the depth value of the target node to the depth value sent by the upstream node of the target node; and in response to that the depth value of the target node is equal to the depth value sent
(Continued)

by the upstream node of the target node, determining that a loop exists in a data dependency path including the target node.

14 Claims, 5 Drawing Sheets

(51) Int. Cl.
*G06F 16/27* (2019.01)
*H04L 45/18* (2022.01)

(56) References Cited

U.S. PATENT DOCUMENTS

| | | | | |
|---|---|---|---|---|
| 9,461,909 | B2 * | 10/2016 | Allan | H04L 45/745 |
| 10,254,996 | B1 * | 4/2019 | Jain | G06F 16/2358 |
| 10,721,260 | B1 * | 7/2020 | Schlarp | G06F 21/577 |
| 2015/0016257 | A1 | 1/2015 | Kumar et al. | |
| 2017/0230277 | A1 * | 8/2017 | Ranns | H04L 45/18 |
| 2018/0189097 | A1 * | 7/2018 | Bruce | G06F 9/467 |
| 2018/0260463 | A1 * | 9/2018 | Matsubara | G06F 16/13 |
| 2020/0042619 | A1 * | 2/2020 | Venkataramani | G06F 16/1844 |
| 2020/0195439 | A1 * | 6/2020 | Suresh | H04L 45/037 |
| 2020/0301757 | A1 * | 9/2020 | Aronovich | G06F 9/5038 |
| 2023/0344229 | A1 * | 10/2023 | Liang | H02J 3/0012 |

FOREIGN PATENT DOCUMENTS

| | | | |
|---|---|---|---|
| CN | 109391526 | A | 2/2019 |
| CN | 112994990 | A | 6/2021 |

OTHER PUBLICATIONS

Liu et al., "Slam Loop Detection Algorithm Based on Deep Neural Network," 2022 2nd International Conference on Networking, Communications and Information Technology (NetCIT) Year: 2022 | Conference Paper | Publisher: IEEE.*

The International Search Report and Written Opinion of the International Searching Authority for International Application No. PCT/CN2022/091537 mailed on Jul. 15, 2022.

* cited by examiner

LOOP DETECTION METHOD AND APPARATUS, ELECTRONIC DEVICE, AND STORAGE MEDIUM

CROSS-RELATED APPLICATIONS

This application is a national stage entry of international application no. PCT/CN2022/091537 filed on May 7, 2022, which claims priority to Chinese Application No. 202110550972.8 filed on May 20, 2021, which is herein incorporated by reference in its entirety.

TECHNICAL FIELD

One or more embodiments of this specification relate to the network service risk identification field, and in particular, to a loop detection method and apparatus, an electronic device, and a storage medium.

BACKGROUND

In a distributed system, a data dependency relationship may exist between nodes that execute concurrent transactions. If several nodes that have a data dependency relationship form a loop, performance of the distributed system may be affected.

For example, when the distributed system is a distributed database system, it is assumed that a node A needs to depend on a result of executing a transaction by a node B. If the node A and the node B form a loop, the node A needs to depend on the result of executing the transaction by the node B, and the node B also needs to depend on a result of executing a transaction by the node A. Consequently, neither the node A nor the node B can normally execute a transaction. Therefore, loop detection needs to be performed.

In the distributed database system, a node is usually locked to prevent the node from contending for a resource. Therefore, if a loop exists in a distributed database, a deadlock occurs. It can be understood that in the distributed database system, loop detection can also be referred to as deadlock detection.

Currently, in some related technologies, a global dependency path needs to be maintained in a node, and then loop detection is performed by using the node. In this case, an operation excessively depends on a single node. If the node is killed, loop detection cannot be performed normally. In addition, the global dependency path needs to be transferred between nodes. Consequently, the node maintains and transfers a large amount of information, and performance of performing a distributed transaction by the node may be reduced. However, in some other loop detection methods, loop detection can be performed only in a single out-degree scenario. Therefore, the loop detection methods cannot be applied to a multi-out-degree scenario.

"Single out-degree" means that a node may depend on only a single node, or a single node depends on a node. "Multi-out-degree" means that a node may depend on a plurality of nodes, or a plurality of nodes may depend on a node.

SUMMARY

In view of this, a first aspect of this specification provides a loop detection method. The method is applied to any target node in a distributed system, the distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node. The method can include: updating the depth value of the target node or a depth value of a downstream node of the target node, so that the depth value of the target node is less than the depth value of the downstream node of the target node; receiving a depth value that is of an upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node; and determine that a loop exists in the data dependency path including the target node, in response to that the depth value of the target node is equal to the depth value that is of the upstream node of the target node and that is transferred by the upstream node.

In some embodiments, the updating the depth value of the target node or a depth value of a downstream node of the target node, so that the depth value of the target node is less than the depth value of the downstream node of the target node includes: periodically updating the depth value of the target node or the depth value of the downstream node of the target node within preset first detection duration, so that the depth value of the target node is less than the depth value of the downstream node of the target node, until the first detection duration expires.

In some embodiments, the updating a depth value of a downstream node of the target node, so that the depth value of the target node is less than the depth value of the downstream node of the target node includes: sending the depth value of the target node to the downstream node, so that the downstream node inputs the depth value of the target node and the depth value of the downstream node into a preset first relationship function in response to receiving the depth value of the target node, to obtain a first depth value, and updates the depth value of the downstream node to the first depth value, where the first relationship function describes an ascending relationship of the depth value of the downstream node of the target node relative to the depth value of the target node.

In some embodiments, the first relationship function is represented by using the following function: P=MAX (DEPTH(A)+N, DEPTH(B)), where P represents the first depth value obtained through calculation, A represents any target node in the data dependency path, B represents a downstream node of the target node A in the data dependency path, DEPTH(A) and DEPTH(B) respectively represent a depth value of the node A and a depth value of the node B, and N is a preset value.

In some embodiments, the updating the depth value of the target node, so that the depth value of the target node is less than the depth value of the downstream node of the target node includes: obtaining the depth value of the downstream node of the target node; inputting the depth value of the target node and the depth value of the downstream node of the target node into a preset second relationship function, to obtain a second depth value, where the second relationship function describes a descending relationship of the depth value of the target node relative to the depth value of the downstream node of the target node; and updating the depth value of the target node to the second depth value.

In some embodiments, the second relationship function is represented by using the following function: Q=MIN (DEPTH(A), DEPTH(B)−M), where Q represents the second depth value obtained through calculation, A represents any target node in the data dependency path, B represents a downstream node of the target node A in the data dependency path, DEPTH(A) and DEPTH(B) respectively represent a depth value of the node A and a depth value of the node B, and M is a preset value.

In some embodiments, the receiving a depth value that is of an upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node includes: periodically receiving, within preset second detection duration, the depth value that is of the upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node, until the second detection duration expires.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; the receiving a depth value sent by an upstream node of the target node includes: receiving the depth value and a public identifier that are sent by the upstream node of the target node; and the determining that a loop exists in the data dependency path including the target node, in response to that the depth value of the target node is equal to the depth value that is of the upstream node of the target node and that is transferred by the upstream node includes: in response to that the depth value of the target node is equal to the depth value that is of the upstream node of the target node and that is transferred by the upstream node, comparing a size of the private identifier of the target node with a size of the public identifier sent by the upstream node of the target node; in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path including the target node, in response to that the private identifier of the target node is equal to the public identifier sent by the upstream node of the target node.

In some embodiments, the method further includes: further sending, by the target node, a loop detection message to the downstream node of the target node when it is determined that a loop exists in the data dependency path including the target node; and determining that a loop exists in the data dependency path including the target node, in response to receiving the loop detection message sent by the upstream node of the target node.

In some embodiments, the private identifier is a globally unique node identifier indicating a priority of a node; the loop detection message includes the private identifier of the target node, and when receiving the loop detection message, after determining that a public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the data dependency path downstream; and the method further includes: in response to receiving the loop detection message sent by the upstream node of the target node, obtaining the private identifier that is of each node and that is carried in the loop detection message, and determining that a node that has the highest priority and that is indicated by the private identifier of each node is a loop processing node; and triggering the loop processing node to be disabled, to remove the loop.

In some embodiments, the method further includes: in response to determining that a loop exists in the data dependency path including the target node, triggering the target node to be disabled, to remove the loop.

In some embodiments, the distributed system includes a distributed database system, the node includes a transaction process configured to execute a database transaction, and the data dependency path includes a path in a WPG wait-for graph constructed based on a lock waiting relationship between transaction processes in the distributed database system.

A second aspect of this specification further provides a loop detection method, applied to any target node in a distributed system, where the distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node; and the method includes: updating the depth value of the target node or a depth value of a downstream node of the target node, so that the depth value of the target node is greater than the depth value of the downstream node of the target node; receiving a depth value that is of an upstream node of the target node and that is transferred by the upstream node, updating the depth value of the target node to the depth value of the upstream node of the target node in response to that the depth value of the target node is greater than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node; and determining that a loop exists in the data dependency path including the target node, in response to that the depth value of the target node is equal to the depth value that is of the upstream node of the target node and that is transferred by the upstream node.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; the receiving a depth value sent by an upstream node of the target node includes: receiving the depth value and a public identifier that are sent by the upstream node of the target node; and the determining that a loop exists in the data dependency path including the target node, in response to that the depth value of the target node is equal to the depth value that is of the upstream node of the target node and that is transferred by the upstream node includes: in response to that the depth value of the target node is equal to the depth value sent by the upstream node of the target node, comparing a size of the private identifier of the target node with a size of the public identifier sent by the upstream node of the target node; in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path including the target node, in response to that the private identifier of the target node is equal to the public identifier sent by the upstream node of the target node.

A third aspect of this specification further provides a loop detection apparatus, applied to any target node in a distributed system, where the distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node; and the apparatus includes: a depth updating module, configured to update the depth value of the target node or a depth value of a downstream node of the target node, so that the depth value of the target node is less than the depth value of the downstream node of the target node; and a depth transfer and loop detection module, configured to: receive a depth value that is of an upstream node of the target node and that is transferred by the upstream node, update the depth value of the target node to the depth value of the upstream node of the target node in response to that the depth value of the target node is less than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node; and determine that a loop exists in the data dependency path including the target node, in response to that the depth value of the target node is equal to the depth value that is of the upstream node of the target node and that is transferred by the upstream node.

A fourth aspect of this specification further provides a loop detection apparatus, applied to any target node in a distributed system, where the distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node; and the apparatus includes: a depth updating module, configured to update the depth value of the target node or a depth value of a downstream node of the target node, so that the depth value of the target node is greater than the depth value of the downstream node of the target node; and a depth transfer and loop detection module, configured to: receive a depth value that is of an upstream node of the target node and that is transferred by the upstream node, update the depth value of the target node to the depth value of the upstream node of the target node in response to that the depth value of the target node is greater than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node; and determine that a loop exists in the data dependency path including the target node, in response to that the depth value of the target node is equal to the depth value that is of the upstream node of the target node and that is transferred by the upstream node.

A fifth aspect of this specification further provides an electronic device, including a processor; and a memory, configured to store processor-executable instructions. The processor runs the executable instructions, to implement the loop detection method shown in any one of the foregoing embodiments.

A sixth aspect of this specification further provides a computer-readable storage medium. The storage medium stores a computer program, and the computer program is used to enable a processor to perform the loop detection method shown in any one of the foregoing embodiments.

In the solutions recorded in the first aspect and the third aspect of this specification, in response to that the depth value of the target node is less than the depth value sent by the upstream node of the target node, the depth value of the target node can be updated to the depth value sent by the upstream node of the target node, and in response to that the depth value of the target node is equal to the depth value sent by the upstream node of the target node, it is determined that a loop exists in the data dependency path including the target node. Therefore, the larger depth of two adjacent nodes is transferred downward. Therefore, it can be ensured that a node with the largest or smallest depth in a loop path always detects the loop, and loop detection does not depend on a single node, to avoid a case in which loop detection cannot be continued after the node is killed.

The depth value of the target node or the depth value of the downstream node of the target node can be updated before depth transfer, so that the depth value of the target node is less than the depth value of the downstream node of the target node. In this way, a depth value of an upstream node in a dependency path is less than a depth value of a downstream node. Therefore, the larger depth value is transferred, to help avoid a case in which a depth of an out-of-loop node at an upstream location is transferred to the loop and loop detection is affected, thereby implementing multi-out-degree loop detection.

In the solutions recorded in the second aspect and the fourth aspect of this specification, in response to that the depth value of the target node is greater than the depth value sent by the upstream node of the target node, the depth value of the target node can be updated to the depth value sent by the upstream node of the target node, and in response to that the depth value of the target node is equal to the depth value sent by the upstream node of the target node, it is determined that a loop exists in the data dependency path including the target node. Therefore, the smaller depth of two adjacent nodes is transferred downward. Therefore, it can be ensured that a node with the smallest depth in a loop path always detects the loop, and loop detection does not depend on a single node, to avoid a case in which loop detection cannot be continued after the node is killed.

In a depth update and depth transfer process, because each node only needs to perform depth transfer between the node and an adjacent node of the node, each node only needs to maintain a dependency relationship between the node and a node directly adjacent to the node, to prevent the node from maintaining a global dependency path, help reduce a workload of the node, and improve performance of executing a transaction by the node.

The depth value of the target node or the depth value of the downstream node of the target node can be updated before depth transfer, so that the depth value of the target node is greater than the depth value of the downstream node of the target node. In this way, a depth value of an upstream node in a dependency path is greater than a depth value of a downstream node. Therefore, the smaller depth value is transferred, to help avoid a case in which a depth of an out-of-loop node at an upstream location is transferred to the loop and loop detection is affected, thereby implementing multi-out-degree loop detection.

DESCRIPTION OF EMBODIMENTS

In this specification, that a distributed system is a distributed database system is used as an example to describe loop detection. For another type of distributed system, references can be made to the distributed database system.

Figure 1:
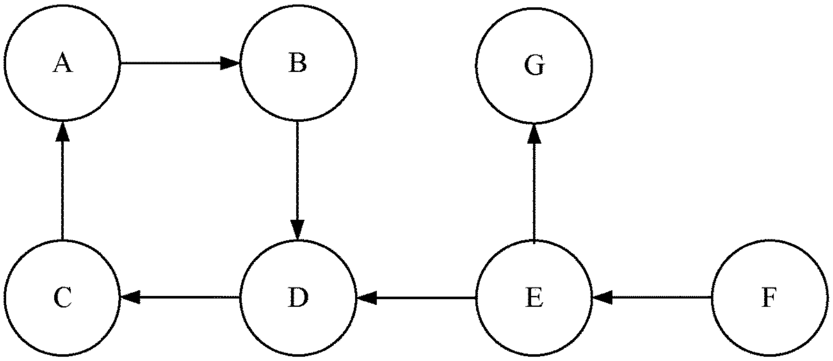
FIG. 1 is a schematic diagram illustrating a dependency path, according to this specification.

FIG. 1 is a schematic diagram illustrating a dependency path, according to this specification.

The following describes some concepts with reference to FIG. 1.

A node is a process of executing a distributed database transaction. Nodes such as nodes A to G shown in FIG. 1 can be from the same physical device or different physical devices.

Dependency relationship: If a node A needs to execute a transaction based on a result of executing a transaction by a node B, it can be considered that the node A depends on the node B, and the node A has a dependency relationship with the node B. The dependency relationship has a direction, and that A depends on B can be represented as A->B, for example, as shown in FIG. 1, node A->B and node D->C. At least one dependency path can exist in parallel in a distributed database system.

Single out-degree: A node may depend on only a single node, or a single node depends on a node, for example, a node A, B, C, F, or G in FIG. 1.

Multi-out-degree: A node may depend on a plurality of nodes, or a plurality of nodes may depend on a node. For example, as shown in FIG. 1, if a node E depends on a node D and a node G, the node E is multi-out-degree.

Dependency path: A plurality of nodes in which there is a dependency relationship between two adjacent nodes form a dependency path. The dependency path has a direction. Two dependency paths are included in FIG. 1, and are respectively F->E->D->C->A->B and F->E->G. A node that needs to depend on another node is referred to as an upstream node. A node on which another node depends is referred to as a downstream node.

Message transfer: Because a node maintains information about a downstream node on which the node depends, an upstream node can send a message to a downstream node. The message in this specification can be a depth, a private identifier, a public identifier, a loop detection message, or the like.

A depth corresponding to a node can represent a path length between a start node in the data dependency path and the target node. It can be understood that, when a distributed system is a distributed database system, the depth can indicate a lock waiting depth of the node. The lock waiting depth is used to represent a lock waiting path length between the start node in the data dependency path and the target node.

Loop path: A path on which two nodes depend on each other (a deadlock occurs in a distributed database system) is formed, for example, a node B and a node D shown in FIG. 1. Herein, D->C->A->B. It can be learned that D indirectly depends on B, and B obviously depends on D. It can be learned that two nodes B and D depend on each other. In other words, a deadlock occurs. A path including node D->C->A->B can be referred to as a loop path.

An in-loop node is a node in a loop path, for example, nodes A, B, C, and D in FIG. 1.

An out-of-loop node is a point outside a loop path, for example, nodes E, F, and G in FIG. 1.

In view of this, this specification provides a loop detection method. In the method, a depth value can be maintained on each node, and the depth value of each node is updated, so that the depth value of each node is less than a depth value of a downstream node of the node, a depth value of each node in a dependency path can almost increase monotonically, and in a depth transfer process, a depth of an out-of-loop node at an upstream location is not transferred to a loop to affect loop detection. Information of a node that has a dependency relationship with each node is maintained in the node, the larger depth is transferred in the dependency path through information exchange between adjacent nodes that have a dependency relationship, and in response to a case in which a depth value of any node is equal to a depth value that is of an upstream node of the node and that is transferred by the upstream node, it is determined that the depth is transferred for one round. That is, a loop is found.

Figure 2:
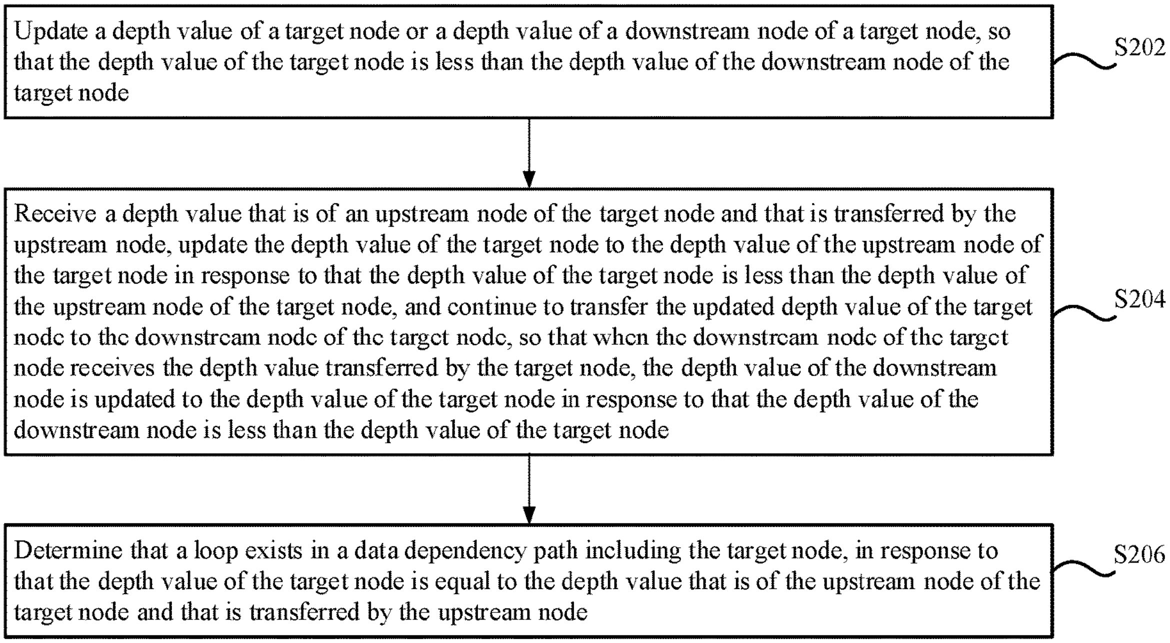
FIG. 2 is a method flowchart illustrating a loop detection method, according to this specification.

FIG. 2 is a method flowchart illustrating a loop detection method, according to this specification.

As shown in FIG. 2, the method can include: S202: Update a depth value of a target node or a depth value of a downstream node of a target node, so that the depth value of the target node is less than the depth value of the downstream node of the target node.

S204: Receive a depth value that is of an upstream node of the target node and that is transferred by the upstream node, update the depth value of the target node to the depth value of the upstream node of the target node in response to that the depth value of the target node is less than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node.

S206: Determine that a loop exists in a data dependency path including the target node, in response to that the depth value of the target node is equal to the depth value that is of the upstream node of the target node and that is transferred by the upstream node.

In this method, in response to that the depth value of the target node is less than the depth value sent by the upstream node of the target node, the depth value of the target node is updated to the depth value sent by the upstream node of the target node, and in response to that the depth value of the target node is equal to the depth value sent by the upstream node of the target node, it is determined that a loop exists in the data dependency path including the target node. Therefore, the larger depth of two adjacent nodes is transferred downward. Therefore, it can be ensured that a node with the largest depth in a loop path always detects the loop, and loop detection does not depend on a single node, to avoid a case in which loop detection cannot be continued after the node is killed.

In a depth update and depth transfer process, because each node only needs to perform depth transfer between the node and an adjacent node of the node, each node only needs to maintain a dependency relationship between the node and a node directly adjacent to the node, to prevent the node from maintaining a global dependency path, help reduce a workload of the node, and improve performance of executing a transaction by the node.

The depth value of the target node or the depth value of the downstream node of the target node can be updated before depth transfer, so that the depth value of the target node is less than the depth value of the downstream node of the target node. In this way, a depth value of an upstream node in a dependency path is less than a depth value of a downstream node. Therefore, the larger depth value is transferred, to help avoid a case in which a depth of an out-of-loop node at an upstream location is transferred to the loop and loop detection is affected, thereby implementing multi-out-degree loop detection.

The method can be applied to any target node in a distributed system (briefly referred to as a system). The system can include a plurality of electronic devices distributed at the same address or different addresses. The electronic devices can cooperate to execute a distributed transaction. A specific type of the electronic device and a specific architecture of the system are not limited in this specification. The distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node.

The following provides descriptions by using an example that an execution body is any target node in the distributed system (briefly referred to as a system).

In some embodiments, when S202 is performed, the depth value of the target node or the depth value of the downstream node of the target node can be updated, so that the depth value of the target node is less than the depth value of the downstream node of the target node.

Figure 3:
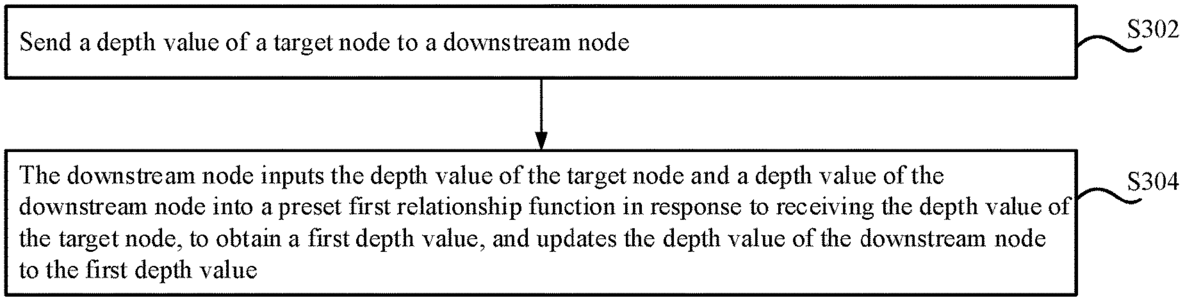
FIG. 3 is a schematic flowchart illustrating a depth updating method, according to this specification.

FIG. 3 is a schematic flowchart illustrating a depth updating method, according to this specification.

As shown in FIG. 3, the target node can perform S302. The depth value of the target node is sent to the downstream node based on a mechanism such as message transfer. Then, the downstream node can perform S304. After receiving the depth value of the target node, the downstream node can input the depth value of the target node and the depth value of the downstream node into a preset first relationship function, to obtain the first depth value, and the depth value of the downstream node is updated to the first depth value.

In some embodiments, the target node can maintain a dependency relationship. The dependency relationship represents a downstream node on which the target node depends. The target node can package depth information of the target node into a message, and send the message to the downstream node of the target node based on the maintained dependency relationship. After receiving the message, the downstream node of the target node can parse out the depth value of the target node.

The first relationship function describes an ascending relationship of the depth value of the downstream node of the target node relative to the depth value of the target node. It can be understood that, any function that can describe the ascending relationship falls within the protection range of this specification.

In some embodiments, the first relationship function can be represented by using the following function: P=MAX (DEPTH(A)+N, DEPTH(B)), where P represents the first depth value obtained through calculation, A represents any target node in the data dependency path, B represents a downstream node of the target node A in the data dependency path, DEPTH(A) and DEPTH(B) respectively represent a depth value of the node A and a depth value of the node B, and N is a preset value.

In the first relationship function, the downstream node can first obtain a sum of the depth value of the target node and N. Then, the obtained sum of the depth value of the target node and N is compared with a depth of the downstream node of the target node, to output the larger value. Therefore, it can be ensured that the depth value of the target node is less than the depth value of the downstream node of the target node. In addition, if the depth value of the target node does not change, the depth value of the downstream node of the target node does not change either.

In some embodiments, when S202 is performed, the depth value of the target node can be updated, so that the depth value of the target node is less than the depth value of the downstream node of the target node.

In some embodiments, the depth value of the downstream node of the target node can be obtained based on the mechanism such as message transfer. Then, the depth value of the target node and the depth value of the downstream node of the target node can be input into a preset second relationship function, to obtain a second depth value. Then, the depth value of the target node can be updated to the second depth value.

The second relationship function is represented by using the following function: Q=MIN(DEPTH(A), DEPTH(B)−M), where Q represents the second depth value obtained through calculation, A represents any target node in the data dependency path, B represents a downstream node of the target node A in the data dependency path, DEPTH(A) and DEPTH(B) respectively represent a depth value of the node A and a depth value of the node B, and M is a preset value.

In the second relationship function, a difference between the depth value of the downstream node of the target node and M can be first obtained. Then, the difference between the obtained depth value of the downstream node and M is compared with the depth of the target node, to output the smaller value. Therefore, it can be ensured that the depth value of the target node is less than the depth value of the downstream node of the target node. In addition, if the depth value of the downstream node of the target node does not change, the depth value of the target node does not change either.

In a distributed task execution process, a dependency relationship between nodes changes in real time, and each node continuously updates a depth. Therefore, when depth transfer is performed, a case in which a depth of an out-of-loop node at an upstream location is greater than a depth of an in-loop node may occur at an instant. Consequently, the depth of the out-of-loop node may be transferred to the loop, affecting loop detection.

In some embodiments, before depth transfer is performed, the depth value of the target node or the depth value of the downstream node of the target node can be periodically updated within preset first detection duration, so that the depth value of the target node is less than the depth value of the downstream node of the target node, until the first detection duration expires.

The first detection duration can be set based on a service requirement, for example, 500 milliseconds. In some embodiments, after one time of depth updating is completed, waiting duration can be set, to perform a next time of depth updating, thereby controlling a node calculation data amount, reducing node calculation load, and improving node performance.

In some embodiments, each target node can periodically perform S302 and S304 within the preset first detection duration. Because there is a simple relationship between an upstream node and a downstream node in out-of-loop nodes, a depth value of the upstream node in the out-of-loop nodes is usually less than a depth value of the downstream node. Therefore, a depth value of the out-of-loop node does not change greatly, and a downstream node in in-loop nodes may be an upstream node of an upstream node of the downstream node. Therefore, a depth value of an upstream node in in-loop nodes may be greater than a depth value of the downstream node, so that a depth value of the in-loop node increases continuously. Because a depth of the in-loop node increases continuously, a depth of an out-of-loop node at an upstream location may be far less than the depth of the in-loop node, thereby helping reduce a probability that the depth of the out-of-loop node is transferred to the loop, and improving loop detection accuracy. In some embodiments, a quantity of execution times can also be set, to periodically perform the steps of depth updating.

S204 and S206 can be performed after node depth updating is completed.

In this specification, each node in the distributed system transfers a depth to a downstream node of the node. Therefore, the target node definitely receives the depth value sent by the upstream node of the target node.

After receiving the depth, the target node can compare the depth value of the target node with the depth value sent by the upstream node of the target node. If the depth value of the target node is less than the depth value sent by the upstream node of the target node, it indicates that the depth value of the target node needs to be updated, and the depth value of the target node can be updated to the depth value sent by the upstream node of the target node, to transfer the larger depth value of the two nodes. After completing the depth update of the target node, the target node can continue to transfer the updated depth value of the target node to the downstream node of the target node, so that when receiving the depth value transferred by the target node, the downstream node of the target node updates the depth value of the downstream node to the depth value of the target node in response to that the depth value of the downstream node is less than the depth value of the target node. Therefore, the larger depth can be transferred in the dependency path.

In some real-time embodiments, the depth value that is of the upstream node of the target node and that is transferred by the upstream node can be periodically received within preset second detection duration, the depth value of the target node is updated to the depth value of the upstream node of the target node in response to that the depth value of the target node is less than the depth value of the upstream node of the target node, and the updated depth value of the target node continues to be transferred to the downstream node of the target node, so that when the downstream node of the target node receives the depth value transferred by the target node, the depth value of the downstream node is updated to the depth value of the target node in response to that the depth value of the downstream node is less than the depth value of the target node. In this way, depth value transfer can be performed continuously in the dependency path, to adapt to more loop detection scenarios such as a scenario in which the loop includes a plurality of nodes.

In response to that the depth value of the target node is equal to the depth value sent by the upstream node of the target node, it can be determined that the depth value of the target node is transferred for one round. Therefore, an interface determines that a loop exists in the data dependency path including the target node.

In some embodiments, in response to determining that a loop exists in the data dependency path including the target node, the target node can be triggered to be disabled, to remove the loop, to ensure that a distributed transaction is successfully executed. In some embodiments, the loop can be removed by rolling back a transaction or releasing a dependency relationship of the target node.

Still as shown in FIG. 1, each node in FIG. 1 can update a depth value of a downstream node of the node based on a dependency relationship maintained by the node, so that a depth value of the node is less than a depth value of a downstream node of the node.

For example, in FIG. 1, an out-of-loop node E depends on an in-loop node D, and a depth updating step is performed, so that a depth of the downstream node D is greater than a depth of the upstream node E.

After depth updating is completed, each node can transfer a depth to a downstream node, so that after receiving a depth transferred by an upstream node, each node can update a depth value of the node to the larger depth value in the depth value of the node and a depth value sent by the upstream node of the node, to complete transfer of the larger depth value. In this way, when any node finds that a depth transferred by an upstream node of the node is the same as a depth of the node, it can be determined that the depth of the node is transferred for one round, and it can be determined that a loop exists in a dependency path including the node.

During depth transfer, because the depth of the node E is smaller, the depth of the node E is not transferred to a loop path, affecting depth transfer in the loop path. In addition, because a maximum depth definitely exists in the loop path, the maximum depth in the loop is definitely transferred in the loop. Therefore, if any node finds that a depth of the node is the same as a depth of an upstream node of the node, it can be determined that the depth of the node is transferred for one round. In other words, a loop exists in a dependency path including the node.

In some embodiments, a private identifier and a public identifier can be allocated to the node. An initial value of the public identifier can be equal to an initial value of the private identifier. Then, the larger public identifier can be transferred in the loop, and when any node finds that a received public identifier is the same as a private identifier of the node, it is determined that a loop exists in a dependency path including the node. In this way, a node with the largest private identifier in the loop can find the loop, so that the node that finds the loop can be flexibly configured by configuring the private identifier of the node.

Certainly, in some embodiments, the smaller public identifier can alternatively be transferred in the loop, and when any node finds that a received public identifier is the same as a private identifier of the node, it is determined that a loop exists in a dependency path including the node. In this way, a node with the smallest private identifier in the loop can find the loop. In this specification, descriptions are provided by using an example in which the larger public identifier is transferred.

In some embodiments, each node in the system can further transfer a public identifier when transferring a depth. When S204 is performed, in addition to receiving the depth value sent by the upstream node, the target node can further receive the public identifier sent by the upstream node of the target node.

Figure 4:
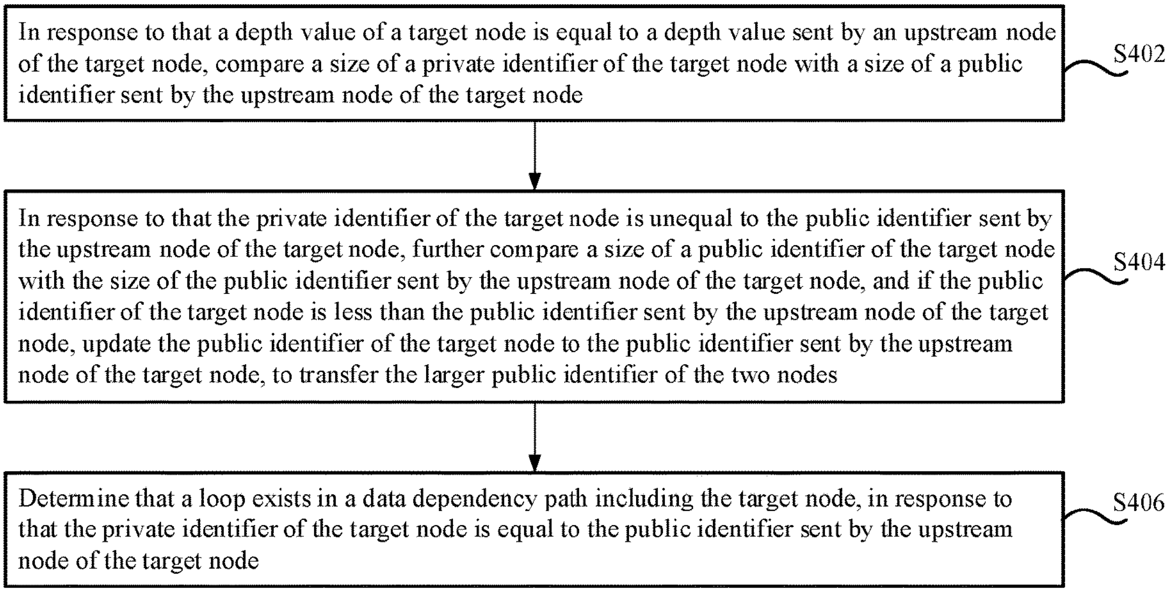
FIG. 4 is a schematic flowchart illustrating loop detection, according to this specification.

FIG. 4 is a schematic flowchart illustrating loop detection, according to this specification.

As shown in FIG. 4, when S206 is performed, S402 can be performed. In response to that the depth value of the target node is equal to the depth value sent by the upstream node of the target node, a size of the private identifier of the target node is compared with a size of the public identifier sent by the upstream node of the target node. Then, S404 is performed. In response to that the private identifier of the target node is unequal to the public identifier sent by the upstream node of the target node, a size of the public identifier of the target node is further compared with the size of the public identifier sent by the upstream node of the target node, and if the public identifier of the target node is less than the public identifier sent by the upstream node of the target node, the public identifier of the target node is updated to the public identifier sent by the upstream node of the target node, to transfer the larger public identifier of the two nodes. In addition, S406 is performed. It is determined that a loop exists in the data dependency path including the target node, in response to that the private identifier of the target node is equal to the public identifier sent by the upstream node of the target node.

The private identifier can be a private identifier allocated to each node in a preset allocation method. The private identifier globally and uniquely corresponds to each node.

In some embodiments, the private identifier can represent a priority for performing loop processing. In some embodiments, the private identifier can be allocated to the node based on information such as a node priority and a generation moment of a dependency relationship. The higher priority indicates the higher private identifier.

The priority can represent an order of a loop processing node. The higher priority indicates an earlier moment at which the node is killed to remove the loop. In some embodiments, the priority can be determined based on at least one of the following: a degree of importance of processing a transaction by a node, duration of processing a transaction by a node, a quantity of node locks, and user customization. Therefore, a proper priority can be determined for the node from different dimensions. After the priority is determined, a unique private identifier can be allocated to the node with reference to information such as a generation time and a dependency relationship of the node.

The public identifier can be transferred between nodes. Before the public identifier is transferred, the initial value of the public identifier of each node can be the same as the initial value of the private identifier. In this way, transferring the public identifier is transferring the private identifier.

In this example, the larger public identifier can be transferred, and a node whose private identifier is equal to a public identifier sent by an upstream node of the node can find a loop. Therefore, a node with the largest private identifier in the loop may find the loop, and the larger private identifier has the higher priority, so that a node with the highest priority in the loop can find the loop. When the loop is removed subsequently, the node is killed, to kill the node with the highest priority.

In some embodiments, when it is determined that a loop may occur, a target node that finds the loop sends a loop detection message in the loop to perform the second time of loop confirmation, thereby reducing an error detection rate of loop detection and improving loop detection correctness.

Figure 5:
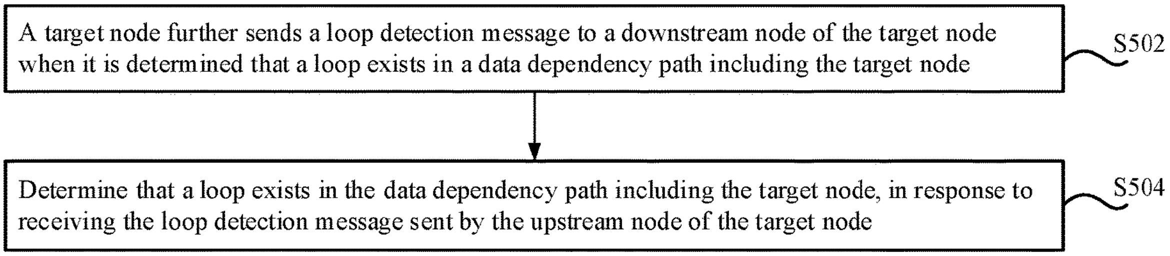
FIG. 5 is a schematic flowchart illustrating a loop detection method, according to this specification.

FIG. 5 is a schematic flowchart illustrating a loop detection method, according to this specification.

As shown in FIG. 5, when S206 is performed, S502 can be performed. The target node further sends a loop detection message to the downstream node of the target node when it is determined that a loop exists in the data dependency path including the target node. Then, S504 can be performed. It is determined that a loop exists in the data dependency path including the target node, in response to receiving the loop detection message sent by the upstream node of the target node.

The loop detection message can include a globally unique private identifier of the target node.

In this example, if the target node is in the loop path, the loop detection message sent by the target node is definitely and finally transferred back to the target node. Therefore, after receiving the loop detection message sent by the target node, the target node can re-determine that a loop exists in the data dependency path including the target node, to achieve the second time of loop confirmation, thereby reducing the loop detection error detection rate, and improving the loop detection correctness.

In some embodiments, private identifier information of nodes in the loop is collected by using the loop detection message. The private identifier is a globally unique node identifier indicating a priority of a node, so that after receiving the detection message, the target node can disable a node with the highest priority in the loop, to remove the loop.

The loop detection message includes the private identifier of the target node. When receiving the loop detection message, the downstream node of the target node can determine whether the public identifier included in the downstream node of the target node is the same as the private identifier included in the loop detection message. If the downstream node of the target node determines that the public identifier of the target node is the same as the private identifier of the target node, the downstream node of the target node can determine that the target node is in the loop, and after adding the private identifier of the downstream node of the target node to the loop detection message, continue to send the loop detection message downward, and so on, to transfer the private identifier of each node in the data dependency path downward. Therefore, the loop detection message can collect the private identifier of the node in the loop.

In a process of transferring the loop detection message, after receiving the loop detection message, the target node can obtain the private identifier that is of each node and that is carried in the loop detection message; determine, as a loop processing node, a node with the highest priority indicated by the private identifier of each node; and trigger the loop processing node to be disabled to remove the loop. In this way, the node with the highest priority in the loop can be killed to remove the loop.

The following describes the embodiments with reference to a specific scenario.

Figure 6A:
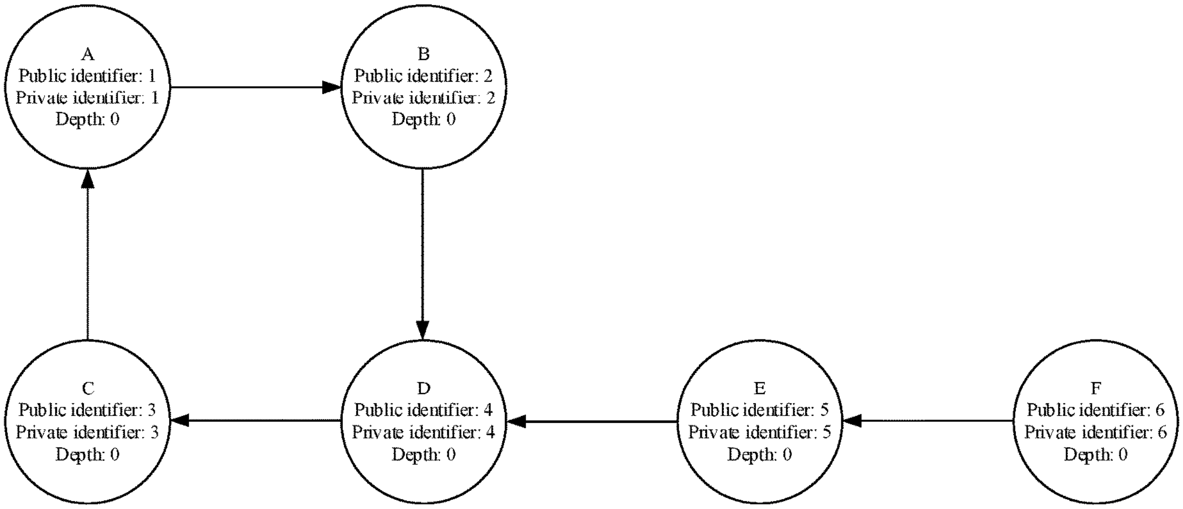
FIGS. 6*a*, 6*b*, 6*c*, and 6*d* each are a schematic diagram illustrating a dependency path, according to this specification.

FIG. 6*a* is a schematic diagram illustrating a dependency path, according to this specification. The dependency path can be a dependency path generated in a distributed database system. A node included in the system can be configured to execute a transaction process of a database transaction. A data dependency path between nodes includes a path in a WFG wait-for graph constructed based on a lock waiting relationship between transaction processes in the distributed database system. A depth of the node can be a lock waiting depth. In this example, loop detection is deadlock detection.

Each node maintains a downstream node on which the node depends. A relationship function further maintained by each node is P=MAX(DEPTH(A)+1, DEPTH(B)). P represents a calculated first depth value, A represents any target node in the data dependency path, B represents a downstream node of the target node A in the data dependency path, and DEPTH(A) and DEPTH(B) respectively represent a depth value of the node A and a depth value of a node B.

The dependency path shown in FIG. 6*a* includes six nodes A, B, C, D, E, and F. The dependency path is F->E->D->C->A->B. In an initial stage, a private identifier can be allocated to each node based on a priority of the node. A value of a private identifier of a node with the higher priority is larger. A public identifier of each node is equal to a private identifier of the node. An initial depth of each node can be set to 0.

When loop detection is performed, the system can first update a depth of each node. In this example, duration of performing this step can be set to 500 milliseconds, and waiting duration of performing this step is set to 10 milliseconds. Because there is a simple relationship between an upstream node and a downstream node in out-of-loop nodes, a depth value of the upstream node in the out-of-loop nodes is usually less than a depth value of the downstream node. Therefore, a depth value of the out-of-loop node does not change greatly, and a downstream node in in-loop nodes may be an upstream node of an upstream node of the downstream node. Therefore, a depth value of an upstream node in in-loop nodes may be greater than a depth value of the downstream node, so that a depth value of the in-loop node increases continuously. Therefore, a depth value of the in-loop node increases continuously, so that a depth of the in-loop node can be greater than a depth of the out-of-loop node after the step is performed for a plurality of times. Because a depth of the in-loop node increases continuously, a depth of an out-of-loop node at an upstream location may be far less than the depth of the in-loop node, thereby helping reduce a probability that the depth of the out-of-loop node is transferred to the loop, and improving loop detection accuracy.

During depth updating, each node in the system can determine whether the node has a downstream node. If the node has a downstream node, a depth of the node is further sent to the downstream node. In response to receiving a depth value sent by an upstream node of the downstream node, the downstream node can input a depth of the downstream node and the received depth value into a maintained relationship function, to obtain the first depth value, and update a depth value of the downstream node to the first depth value.

The downstream node can determine, based on the relationship function, whether the depth value of the downstream node is less than a sum of the depth of the upstream node of the downstream node and 1; and can update the depth value of the downstream node to the sum of the depth of the upstream node of the downstream node and 1 if the depth value of the downstream node is less than the sum of the depth of the upstream node of the downstream node and 1. Therefore, it is ensured that the depth of the upstream node is less than the depth of the downstream node.

Figure 6B:
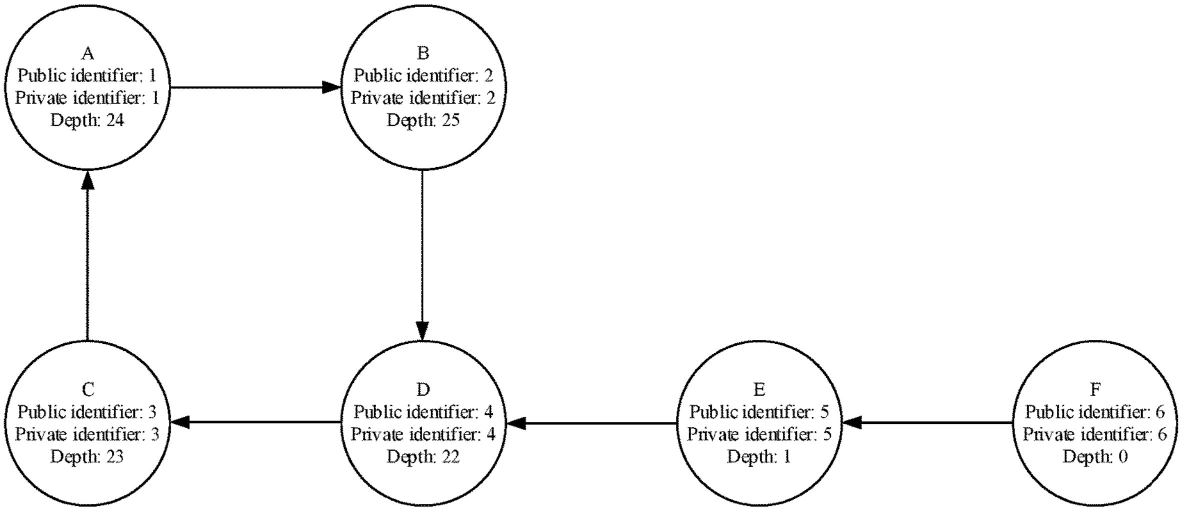

After this step is performed for a plurality of times, FIG. 6*b* is a schematic diagram illustrating a dependency path, according to this specification. As shown in FIG. 6*b*, an out-of-loop node F does not have an upstream node. Therefore, a depth of the node remains 0. An out-of-loop node E has only the upstream node F, and a depth of the out-of-loop node E is equal to a sum of the depth of the node F and 1. Therefore, the depth of the node E remains 1. For each round of depth updating, the depth of the in-loop node is updated, so that the depth of the in-loop node is far greater than the depth of the out-of-loop node. After a plurality of depth updating steps are performed, the depth of each node may be shown in FIG. 6*b*. A depth of a node D is 22, a depth of a node C is 23, a depth of a node B is 25, and a depth of the node A is 24.

Then, the system can perform a step of transferring a depth and a public identifier. In this example, duration of performing the step can be set to 500 milliseconds, to perform the step for a plurality of times, so that the depth and the public identifier can be transferred in the dependency path.

Each node can separately send a depth and a public identifier of the node to a downstream node. After receiving the depth and the public identifier that are sent by the upstream node of the downstream node, the downstream node can compare the depth of the downstream node with the received depth. If the depth of the downstream node is smaller, the depth of the downstream node can be updated to the received depth, to transfer the larger depth.

The node E and the node D shown in FIG. 6*b* are used as examples. The node E sends a depth value 1 of the node E to the node D. The node D can compare the depth value 22 of the node D with the received depth value 1. Because 22 is greater than 1, the node D does not have to update the depth of the node D. Therefore, the larger depth can be transferred.

The node B and the node D shown in FIG. 6*b* are used as examples. The node B sends the depth value 25 of the node B to the node D. The node D can compare the depth value 22 of the node D with the received depth value 25. Because 22 is less than 25, the node D can update the depth of the node D to 25. Therefore, the larger depth can be transferred.

Figure 6C:
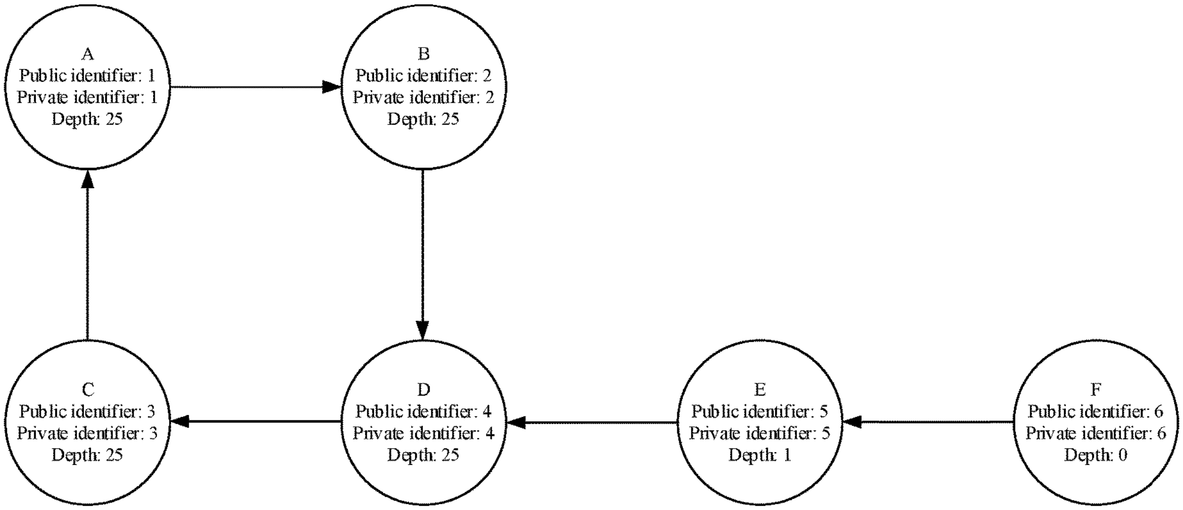

After a plurality of rounds of depth transfer are completed, FIG. 6*c* a schematic diagram illustrating a dependency path, according to this specification. As shown in FIG. 6*c*, after the plurality of rounds of depth transfer are completed, a depth of each in-loop node is the maximum depth 25.

Then, in response to that a depth of each node is the same as a depth of an upstream node of the node, the node can compare a private identifier of the node with a received public identifier. If the private identifier of the node is unequal to the received public identifier, a size of a public identifier of the target node can be further compared with a size of a public identifier sent by an upstream node of the target node, to transfer the larger public identifier.

The node C and the node D shown in FIG. 6*b* are used as examples. The node D sends a public identifier 4 of the node D to the node C. Because the depth of the node C and the depth of the node D are the same, the node C can compare a private identifier 3 of the node C with the received public identifier 4. Because 4 is unequal to 3, the node C can further compare the public identifier 3 of the node C with the received public identifier 4. Because 3 is less than 4, the node C can update the public identifier of the node C to 4. Therefore, the larger public identifier can be transferred.

Figure 6D:
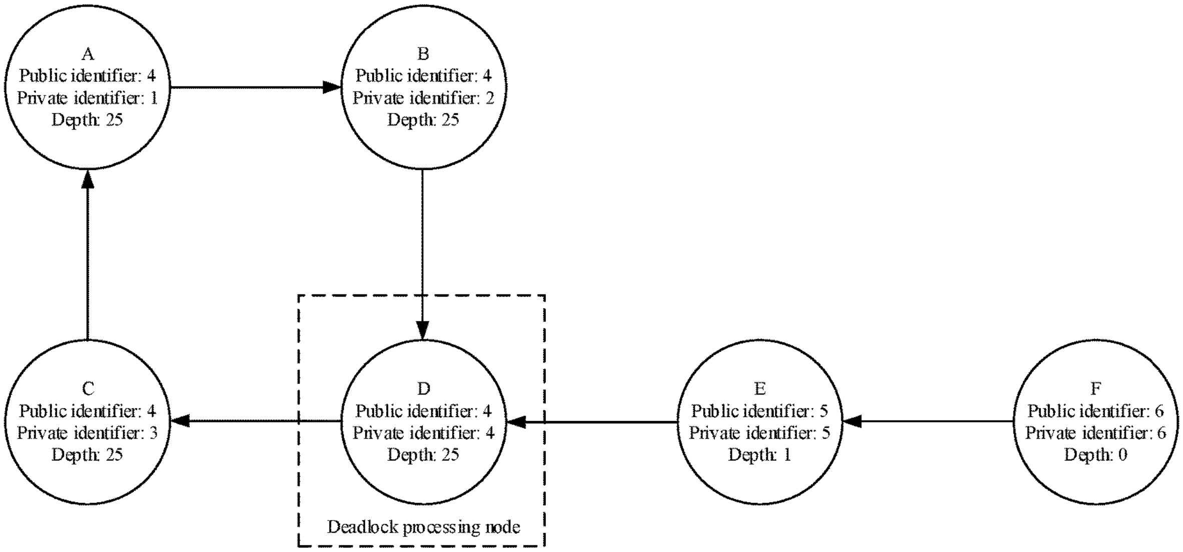

After a plurality of rounds of public identifier transfer are performed, FIG. 6*d* a schematic diagram illustrating a dependency path, according to this specification. As shown in FIG. 6*d*, the largest public identifier in public identifiers in in-loop nodes is 4.

In a process of transferring the public identifier, in response to that a depth of any node is the same as a depth of an upstream node of the any node and a private identifier of the any node is the same as a public identifier of the upstream node of the any node, it is determined that a deadlock occurs in a dependency path including the any node. As shown in FIG. 6*d*, a private identifier of the in-loop node D is 4. During identifier transfer, the node D finds that the private identifier of the node D is the same as a public identifier of the upstream node B of the node D, and therefore, can determine that a deadlock may exist in a path including the node D. Therefore, a node with the largest private identifier and the highest priority in the loop finds the deadlock.

It can be learned that, in this example, each node only needs to maintain a dependency relationship between the node and a node directly adjacent to the node, and only a depth and public identifier information need to be transferred between nodes, to prevent the node from maintaining a global dependency path, thereby reducing workload of the node and improving performance of executing a transaction by the node.

After the deadlock is found, a deadlock recheck step can be performed.

The node D that finds the deadlock can initiate a loop detection message. The message includes the private identifier 4 of the node. The processing node can send the message to the downstream node C. After receiving the message, the downstream node C can verify whether a public identifier maintained by the downstream node C is the private identifier of the node D carried in the message. After the public identifier is transferred, the public identifier of the in-loop node C is definitely 4. Therefore, the node C can determine that the node C is an in-loop node, and add the private identifier 3 of the node C to the message, to send the message to the downstream node of the node C. By analogy, when the processing node receives the loop detection message, and finds that the loop detection message includes a private identifier of the processing node, the processing node can determine that a loop path actually exists, and determine that a deadlock definitely exists. In this way, the deadlock can be rechecked, to avoid false detection.

As shown in FIG. 6*d*, the processing node D can initiate the loop detection message, and recheck the deadlock after receiving the loop detection message again, to reduce a false detection rate.

Then, the node D can determine a node with the largest private identifier or the highest priority from the loop detection message, perform transaction rollback on the node, and eliminate a dependency relationship of the node. In this way, the node with the highest priority can be disabled, and the deadlock is enabled, to avoid a storage transaction blocking.

This specification further provides a loop detection method. The method can be applied to any target node in a distributed system. The distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node. The method can include:

- updating the depth value of the target node or a depth value of a downstream node of the target node, so that the depth value of the target node is greater than the depth value of the downstream node of the target node;
- receiving a depth value that is of an upstream node of the target node and that is transferred by the upstream node, updating the depth value of the target node to the depth value of the upstream node of the target node in response to that the depth value of the target node is greater than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node; and determining that a loop exists in the data dependency path including the target node, in response to that the depth value of the target node is equal to the depth value that is of the upstream node of the target node and that is transferred by the upstream node.

A difference between the method and the foregoing loop detection method is as follows: After depth update of a node is completed, a depth of an upstream node is greater than a depth of a downstream node, and when depth transfer is performed, depth transfer is performed in each dependency path by transferring the smaller depth of two adjacent nodes downward. Other content is basically the same, and is not described in detail below.

In this method, in response to that the depth value of the target node is greater than the depth value sent by the upstream node of the target node, the depth value of the target node is updated to the depth value sent by the upstream node of the target node, and in response to that the depth value of the target node is equal to the depth value sent by the upstream node of the target node, it is determined that a loop exists in the data dependency path including the target node. Therefore, the smaller depth of two adjacent nodes is transferred downward. Therefore, it can be ensured that a node with the smallest depth in a loop path always detects the loop, and loop detection does not depend on a single node, to avoid a case in which loop detection cannot be continued after the node is killed.

In a depth update and depth transfer process, because each node only needs to perform depth transfer between the node and an adjacent node of the node, each node only needs to maintain a dependency relationship between the node and a node directly adjacent to the node, to prevent the node from maintaining a global dependency path, help reduce a workload of the node, and improve performance of executing a transaction by the node.

The depth value of the target node or the depth value of the downstream node of the target node can be updated before depth transfer, so that the depth value of the target node is greater than the depth value of the downstream node of the target node. In this way, a depth value of an upstream node in a dependency path is greater than a depth value of a downstream node. Therefore, the smaller depth value is transferred, to help avoid a case in which a depth of an out-of-loop node at an upstream location is transferred to the loop and loop detection is affected, thereby implementing multi-out-degree loop detection.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; the receiving a depth value sent by an upstream node of the target node includes: receiving the depth value and a public identifier that are sent by the upstream node of the target node; and the determining that a loop exists in the data dependency path including the target node, in response to that the depth value of the target node is equal to the depth value that is of the upstream node of the target node and that is transferred by the upstream node includes: in response to that the depth value of the target node is equal to the depth value that is of the upstream node of the target node and that is transferred by the upstream node, comparing a size of the private identifier of the target node with a size of the public identifier sent by the upstream node of the target node; in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path including the target node, in response to that the private identifier of the target node is equal to the public identifier sent by the upstream node of the target node.

In this way, a node with the largest private identifier in the loop can find the loop. Therefore, a private identifier is configured for the node, to flexibly configure a node that finds the loop.

In some embodiments, the updating the depth value of the target node or a depth value of a downstream node of the target node, so that the depth value of the target node is less than the depth value of the downstream node of the target node includes: periodically updating the depth value of the target node or the depth value of the downstream node of the target node within preset first detection duration, so that the depth value of the target node is less than the depth value of the downstream node of the target node, until the first detection duration expires.

In some embodiments, the updating a depth value of a downstream node of the target node, so that the depth value of the target node is less than the depth value of the downstream node of the target node includes: sending the depth value of the target node to the downstream node, so that the downstream node inputs the depth value of the target node and the depth value of the downstream node into a preset first relationship function in response to receiving the depth value of the target node, to obtain a first depth value, and updates the depth value of the downstream node to the first depth value, where the first relationship function describes an ascending relationship of the depth value of the downstream node of the target node relative to the depth value of the target node.

In some embodiments, the first relationship function is represented by using the following function: P=MAX (DEPTH(A)+N, DEPTH(B)), where P represents the first depth value obtained through calculation, A represents any target node in the data dependency path, B represents a downstream node of the target node A in the data dependency path, DEPTH(A) and DEPTH(B) respectively represent a depth value of the node A and a depth value of the node B, and N is a preset value.

In some embodiments, the updating the depth value of the target node, so that the depth value of the target node is less than the depth value of the downstream node of the target node includes: obtaining the depth value of the downstream node of the target node; inputting the depth value of the target node and the depth value of the downstream node of the target node into a preset second relationship function, to obtain a second depth value, where the second relationship function describes a descending relationship of the depth value of the target node relative to the depth value of the downstream node of the target node; and updating the depth value of the target node to the second depth value.

In some embodiments, the second relationship function is represented by using the following function: Q=MIN (DEPTH(A), DEPTH(B)−M), where Q represents the second depth value obtained through calculation, A represents any target node in the data dependency path, B represents a downstream node of the target node A in the data dependency path, DEPTH(A) and DEPTH(B) respectively represent a depth value of the node A and a depth value of the node B, and M is a preset value.

In some embodiments, the receiving a depth value that is of an upstream node of the target node and that is transferred by the upstream node, updating the depth value of the target node to the depth value of the upstream node of the target node in response to that the depth value of the target node is greater than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node includes: periodically receiving, within preset second detection duration, the depth value that is of the upstream node of the target node and that is transferred by the upstream node, updating the depth value of the target node to the depth value of the upstream node of the target node in response to that the depth value of the target node is greater than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node, until the second detection duration expires.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; the receiving a depth value sent by an upstream node of the target node includes: receiving the depth value and a public identifier that are sent by the upstream node of the target node; and the determining that a loop exists in the data dependency path including the target node, in response to that the depth value of the target node is equal to the depth value that is of the upstream node of the target node and that is transferred by the upstream node includes: in response to that the depth value of the target node is equal to the depth value sent by the upstream node of the target node, comparing a size of the private identifier of the target node with a size of the public identifier sent by the upstream node of the target node; in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path including the target node, in response to that the private identifier of the target node is equal to the public identifier sent by the upstream node of the target node.

In some embodiments, the method further includes: further sending, by the target node, a loop detection message to the downstream node of the target node when it is determined that a loop exists in the data dependency path including the target node; and determining that a loop exists in the data dependency path including the target node, in response to receiving the loop detection message sent by the upstream node of the target node.

In some embodiments, the private identifier is a globally unique node identifier indicating a priority of a node; the loop detection message includes the private identifier of the target node, and when receiving the loop detection message, after determining that a public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the data dependency path downstream; and the method further includes: in response to receiving the loop detection message sent by the upstream node of the target node, obtaining the private identifier that is of each node and that is carried in the loop detection message, and determining that a node that has the highest priority and that is indicated by the private identifier of each node is a loop processing node; and triggering the loop processing node to be disabled, to remove the loop.

In some embodiments, the method further includes: in response to determining that a loop exists in the data dependency path including the target node, triggering the target node to be disabled, to remove the loop.

In some embodiments, the distributed system includes a distributed database system, the node includes a transaction process configured to execute a database transaction, and the data dependency path includes a path in a WPG wait-for graph constructed based on a lock waiting relationship between transaction processes in the distributed database system.

Corresponding to the embodiment, this specification provides a loop detection apparatus. The apparatus is applied to any target node in a distributed system. There is a data dependency relationship between any two adjacent nodes in the data dependency path, the target node maintains a depth value corresponding to the target node, and the depth value represents a path length between a start node in the data dependency path and the target node.

Figure 7:
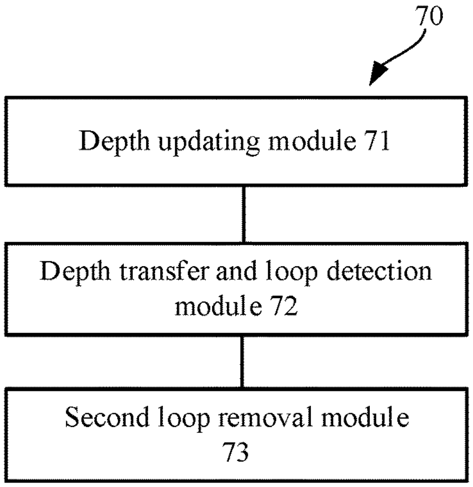
FIG. 7 is a schematic diagram illustrating a structure of a loop detection apparatus, according to this specification.

FIG. 7 is a schematic diagram illustrating a structure of a loop detection apparatus, according to this specification.

As shown in FIG. 7, the apparatus 70 includes: a depth updating module 71, configured to update the depth value of the target node or a depth value of a downstream node of the target node, so that the depth value of the target node is less than the depth value of the downstream node of the target node; and a depth transfer and loop detection module 72, configured to: receive a depth value that is of an upstream node of the target node and that is transferred by the upstream node, update the depth value of the target node to the depth value of the upstream node of the target node in response to that the depth value of the target node is less than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node; and determine that a loop exists in the data dependency path including the target node, in response to that the depth value of the target node is equal to the depth value that is of the upstream node of the target node and that is transferred by the upstream node.

In some embodiments, the depth updating module 71 is configured to periodically update the depth value of the target node or the depth value of the downstream node of the target node within preset first detection duration, so that the depth value of the target node is less than the depth value of the downstream node of the target node, until the first detection duration expires.

In some embodiments, the depth updating module 71 is configured to: send the depth value of the target node to the downstream node, so that the downstream node inputs the depth value of the target node and the depth value of the downstream node into a preset first relationship function in response to receiving the depth value of the target node, to obtain a first depth value, and updates the depth value of the downstream node to the first depth value, where the first relationship function describes an ascending relationship of the depth value of the downstream node of the target node relative to the depth value of the target node.

In some embodiments, the first relationship function is represented by using the following function: P=MAX (DEPTH(A)+N, DEPTH(B)), where P represents the first depth value obtained through calculation, A represents any target node in the data dependency path, B represents a downstream node of the target node A in the data dependency path, DEPTH(A) and DEPTH(B) respectively represent a depth value of the node A and a depth value of the node B, and N is a preset value.

In some embodiments, the depth updating module 71 is configured to: obtain the depth value of the downstream node of the target node; input the depth value of the target node and the depth value of the downstream node of the target node into a preset second relationship function, to obtain a second depth value, where the second relationship function describes a descending relationship of the depth value of the target node relative to the depth value of the downstream node of the target node; and update the depth value of the target node to the second depth value.

In some embodiments, the second relationship function is represented by using the following function: Q=MIN (DEPTH(A), DEPTH(B)−M), where Q represents the second depth value obtained through calculation, A represents any target node in the data dependency path, B represents a downstream node of the target node A in the data dependency path, DEPTH(A) and DEPTH(B) respectively represent a depth value of the node A and a depth value of the node B, and M is a preset value.

In some embodiments, the depth transfer and loop detection module 72 is configured to: periodically receive, within preset second detection duration, the depth value that is of the upstream node of the target node and that is transferred by the upstream node, update the depth value of the target node to the depth value of the upstream node of the target node in response to that the depth value of the target node is less than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node, until the second detection duration expires.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; and the depth transfer and loop detection module 72 is configured to: receive the depth value and a public identifier that are sent by the upstream node of the target node; and in response to that the depth value of the target node is equal to the depth value that is of the upstream node of the target node and that is transferred by the upstream node, compare a size of the private identifier of the target node with a size of the public identifier sent by the upstream node of the target node; in response to that the private identifier of the target node is unequal to the public identifier sent by the upstream node of the target node, further compare a size of the public identifier of the target node with the size of the public identifier sent by the upstream node of the target node, and if the public identifier of the target node is less than the public identifier sent by the upstream node of the target node, update the public identifier of the target node to the public identifier sent by the upstream node of the target node, to transfer the larger public identifier of the two nodes; and determine that a loop exists in the data dependency path including the target node, in response to that the private identifier of the target node is equal to the public identifier sent by the upstream node of the target node.

In some embodiments, the apparatus 70 further includes: a loop detection module. The target node further sends a loop detection message to the downstream node of the target node when it is determined that a loop exists in the data dependency path including the target node; and determines that a loop exists in the data dependency path including the target node, in response to receiving the loop detection message sent by the upstream node of the target node.

In some embodiments, the private identifier is a globally unique node identifier indicating a priority of a node; the loop detection message includes the private identifier of the target node, and when receiving the loop detection message, after determining that a public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the data dependency path downstream; and the apparatus 70 further includes: a first loop releasing module, configured to: in response to receive the loop detection message sent by the upstream node of the target node, obtain the private identifier that is of each node and that is carried in the loop detection message, and determine that a node that has the highest priority and that is indicated by the private identifier of each node is a loop processing node; and trigger the loop processing node to be disabled, to remove the loop.

In some embodiments, the apparatus 70 further includes: a second loop removal module 73, configured to: in response to determining that a loop exists in the data dependency path including the target node, trigger the target node to be disabled, to remove the loop.

In some embodiments, the distributed system includes a distributed database system, the node includes a transaction process configured to execute a database transaction, and the data dependency path includes a path in a WPG wait-for graph constructed based on a lock waiting relationship between transaction processes in the distributed database system.

Corresponding to the embodiment, this specification provides a loop detection apparatus. The apparatus is applied to any target node in a distributed system. The distributed system includes at least one data dependency path including the target node, there is a data dependency relationship between any two adjacent nodes in the data dependency path, the target node maintains a depth value corresponding to the target node, and the depth value represents a path length between a start node in the data dependency path and the target node.

The apparatus 80 includes: a depth updating module 81, configured to update the depth value of the target node or a depth value of a downstream node of the target node, so that the depth value of the target node is less than the depth value of the downstream node of the target node; and a depth transfer and loop detection module 82, configured to: receive a depth value that is of an upstream node of the target node and that is transferred by the upstream node, update the depth value of the target node to the depth value of the upstream node of the target node in response to that the depth value of the target node is greater than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node; and determine that a loop exists in the data dependency path including the target node, in response to that the depth value of the target node is equal to the depth value that is of the upstream node of the target node and that is transferred by the upstream node.

In some embodiments, the depth updating module 81 is configured to periodically update the depth value of the target node or the depth value of the downstream node of the target node within preset first detection duration, so that the depth value of the target node is less than the depth value of the downstream node of the target node, until the first detection duration expires.

In some embodiments, the depth updating module 81 is configured to: send the depth value of the target node to the downstream node, so that the downstream node inputs the depth value of the target node and the depth value of the downstream node into a preset first relationship function in response to receiving the depth value of the target node, to obtain a first depth value, and updates the depth value of the downstream node to the first depth value, where the first relationship function describes an ascending relationship of the depth value of the downstream node of the target node relative to the depth value of the target node.

In some embodiments, the first relationship function is represented by using the following function: P=MAX (DEPTH(A)+N, DEPTH(B)), where P represents the first depth value obtained through calculation, A represents any target node in the data dependency path, B represents a downstream node of the target node A in the data dependency path, DEPTH(A) and DEPTH(B) respectively represent a depth value of the node A and a depth value of the node B, and N is a preset value.

In some embodiments, the depth updating module 81 is configured to: obtain the depth value of the downstream node of the target node; input the depth value of the target node and the depth value of the downstream node of the target node into a preset second relationship function, to obtain a second depth value, where the second relationship function describes a descending relationship of the depth value of the target node relative to the depth value of the downstream node of the target node; and update the depth value of the target node to the second depth value.

In some embodiments, the second relationship function is represented by using the following function: Q=MIN (DEPTH(A), DEPTH(B)−M), where Q represents the second depth value obtained through calculation, A represents any target node in the data dependency path, B represents a downstream node of the target node A in the data dependency path, DEPTH(A) and DEPTH(B) respectively represent a depth value of the node A and a depth value of the node B, and M is a preset value.

In some embodiments, the depth transfer and loop detection module 82 is configured to: periodically receive, within preset second detection duration, the depth value that is of the upstream node of the target node and that is transferred by the upstream node, update the depth value of the target node to the depth value of the upstream node of the target node in response to that the depth value of the target node is greater than the depth value of the upstream node of the target node, and continue to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node, until the second detection duration expires.

In some embodiments, the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier; and the depth transfer and loop detection module 82 is configured to: receive the depth value and a public identifier that are sent by the upstream node of the target node; and in response to that the depth value of the target node is equal to the depth value that is of the upstream node of the target node and that is transferred by the upstream node, compare a size of the private identifier of the target node with a size of the public identifier sent by the upstream node of the target node; in response to that the private identifier of the target node is unequal to the public identifier sent by the upstream node of the target node, further compare a size of the public identifier of the target node with the size of the public identifier sent by the upstream node of the target node, and if the public identifier of the target node is less than the public identifier sent by the upstream node of the target node, update the public identifier of the target node to the public identifier sent by the upstream node of the target node, to transfer the larger public identifier of the two nodes; and determine that a loop exists in the data dependency path including the target node, in response to that the private identifier of the target node is equal to the public identifier sent by the upstream node of the target node.

In some embodiments, the apparatus 80 further includes: a loop detection module. The target node further sends a loop detection message to the downstream node of the target node when it is determined that a loop exists in the data dependency path including the target node; and determines that a loop exists in the data dependency path including the target node, in response to receiving the loop detection message sent by the upstream node of the target node.

In some embodiments, the private identifier is a globally unique node identifier indicating a priority of a node; the loop detection message includes the private identifier of the target node, and when receiving the loop detection message, after determining that a public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the data dependency path downstream; and the apparatus 80 further includes: a third loop releasing module, configured to: in response to receive the loop detection message sent by the upstream node of the target node, obtain the private identifier that is of each node and that is carried in the loop detection message, and determine that a node that has the highest priority and that is indicated by the private identifier of each node is a loop processing node; and trigger the loop processing node to be disabled, to remove the loop.

In some embodiments, the apparatus 80 further includes: a fourth loop removal module 83, configured to: in response to determining that a loop exists in the data dependency path including the target node, trigger the target node to be disabled, to remove the loop.

In some embodiments, the distributed system includes a distributed database system, the node includes a transaction process configured to execute a database transaction, and the data dependency path includes a path in a WPG wait-for graph constructed based on a lock waiting relationship between transaction processes in the distributed database system.

Embodiments of the loop detection apparatus shown in this specification can be applied to an electronic device. Correspondingly, this specification discloses an electronic device. The device can include: a processor; and a memory, configured to store processor-executable instructions.

The processor is configured to invoke the executable instructions stored in the memory, to implement the loop detection method shown in any one of the foregoing embodiments.

Figure 8:
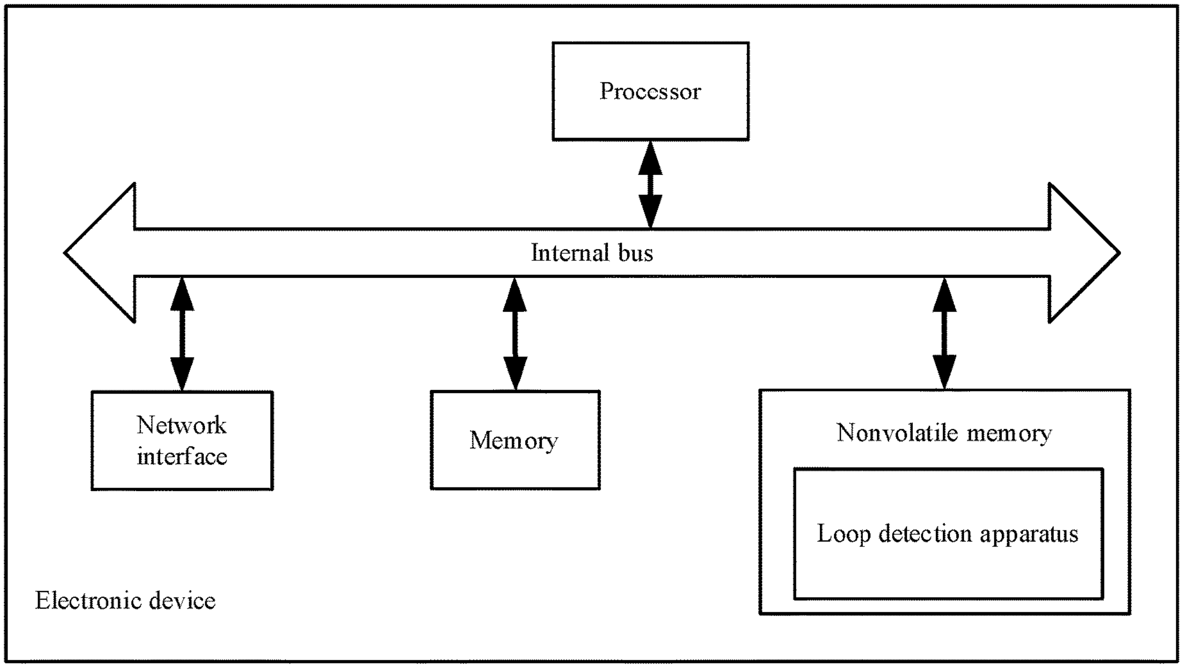
FIG. 8 is a schematic diagram illustrating a hardware structure of an electronic device, according to this specification.

FIG. 8 is a schematic diagram illustrating a hardware structure of an electronic device, according to this specification.

As shown in FIG. 8, the electronic device can include: a processor, configured to execute instructions; a network interface, configured to perform a network connection; a memory, configured to store running data for the processor; and a nonvolatile memory, configured to store instructions corresponding to a loop detection apparatus.

The embodiments of the apparatus can be implemented by using software, or can be implemented by using hardware or a combination of software and hardware. Software implementation is used as an example. As a logical apparatus, the apparatus is formed by reading corresponding computer program instructions in a nonvolatile memory to a memory by a processor of an electronic device in which the apparatus is located. In terms of hardware, in addition to the processor, the memory, the network interface, and the nonvolatile memory shown in FIG. 8, the electronic device in which the apparatus in the embodiment is located can usually include other hardware based on an actual function of the electronic device. Details are omitted here.

It can be understood that, instructions corresponding to the loop detection apparatus can also be directly stored in the memory, to improve a processing speed. This is not limited herein.

This specification provides a computer-readable storage medium. The storage medium stores a computer program, and the computer program is used to enable a processor to perform the loop detection method shown in any one of the foregoing embodiments.

A person skilled in the art should understand that one or more embodiments of this specification can be provided as a method, a system, or a computer program product. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (which can include but be not limited to a disk memory, a CD-ROM, an optical memory, etc.) that include computer-usable program code.

"And/or" recorded in this specification indicates that there is at least one of the two. For example, "A and/or B" includes three solutions: A, B, and "A and B".

The embodiments of this specification are described in a progressive way. For same or similar parts of the embodiments, mutual references can be made to the embodiments. Each embodiment focuses on a difference from other embodiments. Particularly, the data processing device embodiments are basically similar to the method embodiments, and therefore are described briefly. For related parts, references can be made to some descriptions in the method embodiments.

Specific embodiments of this specification are described above. Other embodiments fall within the scope of the appended claims. In some cases, the behaviors or steps described in the claims can be performed in a sequence different from that in some embodiments and desired results can still be achieved. In addition, the process depicted in the accompanying drawings does not necessarily need a particular sequence or consecutive sequence to achieve the desired results. In some implementations, multi-tasking and parallel processing are feasible or may be advantageous.

Embodiments of a subject and a function operation described in this specification can be implemented below: a digital electronic circuit, computer software or firmware that is materially embodied, computer hardware that includes a structure disclosed in this specification and a structural equivalent thereof, or one or a combination thereof. Embodiments of the subject described in this specification can be implemented as one or more computer programs. In other words, one or more modules of computer program instructions encoded on a tangible non-temporary program carrier that are executed or controlled by a data processing apparatus by the data processing apparatus. Alternatively or additionally, program instructions can be encoded on an artificially generated propagation signal, for example, an electrical, optical, or electromagnetic signal generated by a machine. The signal is generated, to encode and transmit information to a proper receiver apparatus to be executed by a data processing apparatus. The computer storage medium can be a machine-readable storage device, a machine-readable storage substrate, a random or serial access memory device, or a combination of one or more thereof.

Processing and logic procedures described in this specification can be executed by one or more programmable computers that execute one or more computer programs, to perform an operation based on input data, and generate an output to perform a corresponding function. The processing and logic procedures can alternatively be performed by a dedicated logic circuit, for example, a field programmable gate array (FPGA) or an application-specific integrated circuit (ASIC), and the apparatus can also be implemented as a dedicated logic circuit.

A computer suitable to execute the computer program include, for example, a general and/or dedicated microprocessor, or any other type of central processing system. Usually, the central processing system receives instructions and data from a read-only memory and/or a random access memory. Basic components of the computer include a central processing system for implementing or executing instructions and one or more memory devices for storing instructions and data. Usually, a computer further include one or more large-capacity storage devices for storing data such as a magnetic disk, a magneto-optical disk, or an optical disk, or the computer is operably coupled to the large-capacity storage device, to receive data from or transfer data to the large-capacity storage device, or both of which exist. However, the computer does not have to include such a device. In addition, the computer can be embedded in another device, for example, a mobile phone, a personal digital assistant (PDA), a mobile audio or video player, a game console, a global positioning system (GPS) receiver, or a portable storage device such as a universal serial bus (USB) flash drive. Only several examples are provided.

A computer-readable medium suitable to store computer program instructions and data includes all forms of non-volatile memories, media, and memory devices such as a semiconductor memory device (for example, an EPROM, an EEPROM, and a flash memory device), a magnetic disk (for example, an internal hard disk or a removable disk), a magneto-optical disk, 0xCD_00 ROM, and a DVD-ROM disk. The processor and the memory can be supplemented by the dedicated logic circuit or incorporated into the dedicated logic circuit.

Although this specification includes many specific implementation details, these should not be construed as limiting any disclosed scope or claimed scope, but are mainly used to describe the features of specific disclosed embodiments. Some features described in a plurality of embodiments in this specification can also be implemented in combination in a single embodiment. In addition, various features described in a single embodiment can also be implemented separately in a plurality of embodiments or in any suitable sub-combination. In addition, although features can function in some combinations as described above and even initially claim protection, one or more features in the claimed combination can be removed from the combination in some cases, and the claimed combination can point to a sub-combination or a variant of a sub-combination.

Similarly, although operations are depicted in a particular order in the accompanying drawings, this should not be understood as requiring these operations to be executed in the shown particular order or sequential order, or requiring all illustrated operations to be executed to achieve the desired results. In some cases, multi-task and parallel processing may be advantageous. In addition, separation of various system modules and components in the embodiments should not be understood as requiring such separation in all embodiments, and it should be understood that the described program components and systems can be usually integrated into a single software product or packaged into a plurality of software products.

Therefore, specific embodiments of the subject are described. Other embodiments fall within the scope of the appended claims. In some cases, actions described in the claims can be performed in a different sequence and desired results are still achieved. In addition, processing depicted in the accompanying drawings is not necessarily in a shown particular order or sequential order to achieve the desired results. In some implementations, multi-task and parallel processing may be advantageous.

The foregoing descriptions are merely example embodiments of one or more embodiments of this specification, but are not intended to limit the one or more embodiments of this specification. Any modification, equivalent replacement, improvement, and the like made without departing from the spirit and principle of the one or more embodiments of this specification shall fall within the protection scope of the one or more embodiments of this specification.

What is claimed is:

1. A loop detection method, applied to any target node in a distributed system, wherein the distributed system comprises at least one data dependency path comprising the target node, there is a data dependency relationship between any two adjacent nodes in the data dependency path, the target node maintains a depth value corresponding to the target node, and the depth value represents a path length between a start node in the data dependency path and the target node; and the method comprises:

updating the depth value of the target node or a depth value of a downstream node of the target node, so that the depth value of the target node is less than the depth value of the downstream node of the target node;

receiving a depth value that is of an upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node;

determining that a loop exists in the data dependency path comprising the target node, in response to that the depth value of the target node is equal to the depth value that is of the upstream node of the target node and that is transferred by the upstream node; and in response to determining that a loop exists in the data dependency path comprising the target node, triggering the target node to be disabled, to remove the loop.

2. The method according to claim 1, wherein the updating the depth value of the target node or a depth value of a downstream node of the target node, so that the depth value of the target node is less than the depth value of the downstream node of the target node comprises:

periodically updating the depth value of the target node or the depth value of the downstream node of the target node within preset first detection duration, so that the depth value of the target node is less than the depth value of the downstream node of the target node, until the first detection duration expires.

3. The method according to claim 1, wherein the updating a depth value of a downstream node of the target node, so that the depth value of the target node is less than the depth value of the downstream node of the target node comprises:

sending the depth value of the target node to the downstream node, so that the downstream node inputs the depth value of the target node and the depth value of the downstream node into a preset first relationship function in response to receiving the depth value of the target node, to obtain a first depth value, and updates the depth value of the downstream node to the first depth value, wherein the first relationship function describes an ascending relationship of the depth value of the downstream node of the target node relative to the depth value of the target node.

4. The method according to claim 3, wherein the first relationship function is represented by using the following function:

P=MAX (DEPTH (A)+N, DEPTH (B)), wherein P represents the first depth value obtained through calculation, A represents any target node in the data dependency path, B represents a downstream node of the target node A in the data dependency path, DEPTH (A) and DEPTH (B) respectively represent a depth value of the node A and a depth value of the node B, and N is a preset value.

5. The method according to claim 1, wherein the updating the depth value of the target node, so that the depth value of the target node is less than the depth value of the downstream node of the target node comprises:

obtaining the depth value of the downstream node of the target node;

inputting the depth value of the target node and the depth value of the downstream node of the target node into a preset second relationship function, to obtain a second depth value, wherein the second relationship function describes a descending relationship of the depth value of the target node relative to the depth value of the downstream node of the target node; and updating the depth value of the target node to the second depth value.

6. The method according to claim 5, wherein the second relationship function is represented by using the following function:

Q=MIN (DEPTH (A), DEPTH (B)-M), wherein

Q represents the second depth value obtained through calculation, A represents any target node in the data dependency path, B represents a downstream node of the target node A in the data dependency path, DEPTH (A) and DEPTH (B) respectively represent a depth value of the node A and a depth value of the node B, and M is a preset value.

7. The method according to claim 1, wherein the receiving a depth value that is of an upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node comprises:

periodically receiving, within preset second detection duration, the depth value that is of the upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node, until the second detection duration expires.

8. The method according to claim 1, wherein the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier;

receiving the depth value that is of the upstream node of the target node and that is transferred by the upstream node comprises:

receiving the depth value and a public identifier that are sent by the upstream node of the target node; and the determining that a loop exists in the data dependency path comprising the target node, in response to that the depth value of the target node is equal to the depth value that is of the upstream node of the target node and that is transferred by the upstream node comprises:

in response to that the depth value of the target node is equal to the depth value that is of the upstream node of the target node and that is transferred by the upstream node, comparing a size of the private identifier of the target node with a size of the public identifier sent by the upstream node of the target node;

in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path comprising the target node, in response to that the private identifier of the target node is equal to the public identifier sent by the upstream node of the target node.

9. The method according to claim 8, wherein the method further comprises:

further sending, by the target node, a loop detection message to the downstream node of the target node when it is determined that a loop exists in the data dependency path comprising the target node; and determining that a loop exists in the data dependency path comprising the target node, in response to receiving the loop detection message sent by the upstream node of the target node.

10. The method according to claim 9, wherein the private identifier is a globally unique node identifier indicating a priority of a node;

the loop detection message comprises the private identifier of the target node, and when receiving the loop detection message, after determining that a public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the data dependency path downstream; and the method further comprises:

in response to receiving the loop detection message sent by the upstream node of the target node, obtaining the private identifier that is of each node and that is carried in the loop detection message, and determining that a node that has the highest priority and that is indicated by the private identifier of each node is a loop processing node; and triggering the loop processing node to be disabled, to remove the loop.

11. The method according to claim 1, wherein the distributed system comprises a distributed database system, the node comprises a transaction process configured to execute a database transaction, and the data dependency path comprises a path in a WPG wait-for graph constructed based on a lock waiting relationship between transaction processes in the distributed database system.

12. A loop detection method, applied to any target node in a distributed system, wherein the distributed system comprises at least one data dependency path comprising the target node, there is a data dependency relationship between any two adjacent nodes in the data dependency path, the target node maintains a depth value corresponding to the target node, and the depth value represents a path length between a start node in the data dependency path and the target node; and the method comprises:

updating the depth value of the target node or a depth value of a downstream node of the target node, so that the depth value of the target node is greater than the depth value of the downstream node of the target node;

receiving a depth value that is of an upstream node of the target node and that is transferred by the upstream node, updating the depth value of the target node to the depth value of the upstream node of the target node in response to that the depth value of the target node is greater than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is greater than the depth value of the target node;

determining that a loop exists in the data dependency path comprising the target node, in response to that the depth value of the target node is equal to the depth value that is of the upstream node of the target node and that is transferred by the upstream node; and in response to determining that a loop exists in the data dependency path comprising the target node, triggering the target node to be disabled, to remove the loop.

13. The method according to claim 12, wherein the target node further maintains a private identifier and a public identifier that correspond to the target node, the public identifier is used to be transferred between nodes, the private identifier is used to indicate the node corresponding to the private identifier, and an initial value of the public identifier of the node is the same as an initial value of the private identifier;

the receiving a depth value sent by an upstream node of the target node comprises:

receiving the depth value and a public identifier that are sent by the upstream node of the target node; and the determining that a loop exists in the data dependency path comprising the target node, in response to that the depth value of the target node is equal to the depth value that is of the upstream node of the target node and that is transferred by the upstream node comprises:

in response to that the depth value of the target node is equal to the depth value sent by the upstream node of the target node, comparing a size of the private identifier of the target node with a size of the public identifier sent by the upstream node of the target node;

in response to that the private identifier of the target node is unequal to the public identifier sent by the upstream node of the target node, further comparing a size of the public identifier of the target node with the size of the public identifier sent by the upstream node of the target node, and if the public identifier of the target node is less than the public identifier sent by the upstream node of the target node, updating the public identifier of the target node to the public identifier sent by the upstream node of the target node, to transfer the larger public identifier of the two nodes; and determining that a loop exists in the data dependency path comprising the target node, in response to that the private identifier of the target node is equal to the public identifier sent by the upstream node of the target node.

14. An electronic device comprising a memory and a processor, wherein the memory stores executable instructions that, in response to execution by the processor, cause processor to perform a loop detection method, wherein the method is applied to any target node in a distributed system, wherein the distributed system comprises at least one data dependency path comprising the target node, there is a data dependency relationship between any two adjacent nodes in the data dependency path, the target node maintains a depth value corresponding to the target node, and the depth value represents a path length between a start node in the data dependency path and the target node; and wherein the method comprises:

updating the depth value of the target node or a depth value of a downstream node of the target node, so that the depth value of the target node is less than the depth value of the downstream node of the target node;

receiving a depth value that is of an upstream node of the target node and that is transferred by the upstream node, updating the depth value of the target node to the depth value of the upstream node of the target node in response to that the depth value of the target node is less than the depth value of the upstream node of the target node, and continuing to transfer the updated depth value of the target node to the downstream node of the target node, so that when the downstream node of the target node receives the depth value transferred by the target node, the depth value of the downstream node is updated to the depth value of the target node in response to that the depth value of the downstream node is less than the depth value of the target node;

determining that a loop exists in the data dependency path comprising the target node, in response to that the depth value of the target node is equal to the depth value that is of the upstream node of the target node and that is transferred by the upstream node; and in response to determining that a loop exists in the data dependency path comprising the target node, triggering the target node to be disabled, to remove the loop.

* * * * *